(12) United States Patent
McKinnon

(10) Patent No.: US 7,272,616 B1
(45) Date of Patent: Sep. 18, 2007

(54) METHOD AND APPARATUS FOR GENERATING CUSTOM CONFIGURED OUTPUT

(75) Inventor: Simon McKinnon, Shenfield (GB)

(73) Assignee: OAG Worldwide Limited, Dunstable, Bedfordshire (GB)

( * ) Notice: Subject to any disclaimer, the term of this patent is extended or adjusted under 35 U.S.C. 154(b) by 480 days.

(21) Appl. No.: 10/902,609

(22) Filed: Jul. 29, 2004

(51) Int. Cl.
*G06F 17/00* (2006.01)
*G06F 7/00* (2006.01)

(52) U.S. Cl. .................... 707/102; 707/10; 707/203

(58) Field of Classification Search .............. 707/2, 707/8–10, 100–102, 103 R, 104.1, 201, 203; 715/500, 511, 513; 705/1, 7–9, 37
See application file for complete search history.

(56) References Cited

U.S. PATENT DOCUMENTS

| | | | | |
|---|---|---|---|---|
| 5,301,320 A | * | 4/1994 | McAtee et al. | 705/9 |
| 5,826,239 A | * | 10/1998 | Du et al. | 705/8 |
| 6,415,277 B1 | | 7/2002 | Klatt | |
| 6,415,297 B1 | * | 7/2002 | Leymann et al. | 707/201 |
| 6,442,594 B1 | * | 8/2002 | Ouchi | 709/206 |
| 6,904,161 B1 | * | 6/2005 | Becker et al. | 382/128 |
| 7,096,223 B2 | * | 8/2006 | Cope | 707/100 |
| 7,113,959 B1 | * | 9/2006 | Klatt et al. | 707/104.1 |
| 2003/0023675 A1 | * | 1/2003 | Ouchi et al. | 709/203 |

* cited by examiner

*Primary Examiner*—Jeffrey Gaffin
*Assistant Examiner*—Jacques Veillard
(74) *Attorney, Agent, or Firm*—Barnes & Thornburg LLP

(57) ABSTRACT

The invention relates to a method and apparatus for generating custom configured documents from a content database such as an airline database. The method uses component processes each defined by code, at least some of the component processes having variable parameters, and predefined workflow templates, each workflow template defining a series of component processes leading to the generation of a generic class of output document. To produce a specific output document, a particular workflow template and selection parameters are input. The values of the variable parameters of the component processes are calculated, and a scheduling engine then executes the code of the series of component processes defined in the particular workflow template. The workflow steps may include in particular extracting data from the content database depending on the determined values of the variable parameters; and generating a specific output document being an instance of the generic class of output document, the specific output document being defined by the particular workflow template, the data extracted from the content database, and a format determined by the workflow template and the variable parameters.

18 Claims, 4 Drawing Sheets

METHOD AND APPARATUS FOR GENERATING CUSTOM CONFIGURED OUTPUT

FIELD OF THE INVENTION

The invention relates to a method and apparatus for generating custom configured output, and in particular to a method and apparatus for automatically generating outputom content databases.

BACKGROUND ART

The preparation of a document product from a content database involves the bringing together of a large amount of data to create the content database, the extraction of the relevant parts of that data from the content database and the formatting of the data in a way that makes it possible for a user to easily obtain desired information. This generally requires separate processing and programming for each delivered product, for example to determine which data is relevant, to determine how the data will be presented, and to ensure that the data extraction extracts and includes in the printed product only the data relevant for a particular product.

The preparation and programming needed to achieve the automatic workflow is both costly and time consuming.

For example, to generate an airline timetable, it is necessary to collect data from airlines, to extract the relevant parts of that data, for example flight numbers, departure airport and time and arrival airport or airports and corresponding arrival times, and to present that information in an easy to use format. It may be necessary, for example, to identify all routes between two cities, including indirect routes via other cities, and to present the reasonably convenient options for travel between the two cities together.

Conventional processes for preparing such timetables require a significant amount of human intervention and indeed programming time to prepare the timetable. After the humans have designed the routing, formatting and presentation options, a program can be run to automatically extract the data from a database and to format it in the manner programmed into the computer.

After the timetable is designed, it can be printed onto paper and distributed, or distributed electronically.

Such conventional processes for preparing timetables may be practical, for example for a printed world airline timetable with a validity of a month, or even six months. However, existing methods of preparing timetables are not suitable for preparing timetables very rapidly or cheaply in view of the large amount of human intervention required. This can add to the cost of producing a timetable, and makes it much more difficult to prepare individual timetables for narrower sections of the market, should the need arise.

Similar issues arise in other areas where documents need to be prepared from information contained in databases, for example telephone directories.

In the field of enterprise management, U.S. Pat. No. 6,415,277 (Klatt et al) describes the use of a corporate database and rules to trigger certain print jobs when certain business-related events occur. For example, the employment of a new employee in a particular position may automatically trigger the printing of business cards for that employee. Nevertheless, it is still necessary to manually set up the rules.

There thus remains a need for an improved method of preparing documents from databases.

SUMMARY OF INVENTION

The invention provides a multi-stage method of producing an output document from data in one or more content databases. Note that the term "output document" is used in the present specification to refer not just to printed documents, but to human or machine readable electronic documents as well as documents combining executable code with the information extracted from the database or databases. The term "output document" therefore includes data extracts, web content, and installable software containing data.

Generic output documents are defined in workflow templates. Each workflow template is a workflow definition from which different instances can be created by varying parameters applied to the workflow definition. Each instance will be referred to as a product and the set of products defined by a workflow template will be referred to as a product class.

To generate a particular output document for a particular task, a user need do nothing more than select the generic type of output document, and hence the corresponding workflow template, and then input the variable parameters to specify the required instance of that workflow template. The required output document can then be generated with no more input.

This method allows the complex programming to determine precise workflows to be carried out once for a generic type of output document, including at this early stage any necessary complex coding and human intervention to define the production process, and then simply producing instances of the generic output document tailored to specific requirements.

Further, the various component processes in the workflow templates can be shared between different workflow templates.

According to an aspect of the invention there is provided a method of producing documents from a content database comprising:

defining a plurality of workflow templates, each workflow template defining a series of component processes leading to the generation of a generic class of output document, at least some of component processes of each workflow template having variable parameters;

accepting input values of variable parameters of the particular workflow template from the selection parameters to define a product as an instance of a particular workflow template having particular selection parameters determining the requirements of the document to be output; and carrying out the component processes of the particular workflow template, the component processes including:

extracting data from the content database depending on the determined values of the variable parameters; and generating a number of output documents each being an instance of the generic output document defined by the particular workflow template including data extracted from the content database in a format determined by the workflow template and the variable parameters.

The step of generating a number of output documents may include printing copies of the output document. Alternatively or additionally, the step of generating a number of output documents may include generating an electronic file, which may be in human-readable format or a format interpretable by a computer.

Note also that the "number" of output documents may be one, i.e. it is possible to produce only a single output document if required.

The method is particularly applicable to automatically generating output documents from large content databases, for example including over 10 000 records. It is particularly suitable to such tasks as producing output documents such as flight timetables or telephone directories. Thus, the content database may be an airline flight information database.

For example, given a content database including all airline flight information for a number of airlines, the method allows the definition of a workflow template being airline flight information for a specific airline, with variable parameters including the identity of any airline partners, whether connections on partner airlines, all airlines or no other airlines should be included, and formatting information including the size of booklet, or in the case of an electronic document the size and type of electronic document to be produced, for example, word processor file, typesetting file or portable document format (pdf) file. The workflow template can include component processes for extracting the data from the contents database, calculating required connections and then producing an output document, including for example workflows for sending an electronic output document to a printer with a message indicating how many physical copies are required so that a required number of documents can be delivered with no further intervention.

Then, if it is required to produce an airline timetable for a specific airline, the identity of the airline, the identity of the airline and partners are keyed in, together with workflow variable parameters specifying the required output, for example a booklet of a particular size, and other information specifying the level of detail required, for example parameters setting the number of connections printed.

The workflow template preferably includes producing as an intermediate step the step of producing a draft document for checking, accepting input amending the draft document and then producing the number of output documents required based on the amended draft.

Thus, in the airline timetable for a specific airline example, the workflow template for producing a single-airline timetable preferably include the component process of outputting a draft document for checking, for example electronically to a computer of a user, for that user to check the draft, make amendments required, and then to approve the document or reject the document.

The workflow templates preferably include also the step of distributing the output document, whether by sending them electronically for example by email to a client or a client's customers or by automatically generating orders to a shipping company to pick up the physical documents from the printer and shipping them.

The component processes may include some or all of the following component processes:

data extraction;

data manipulation;

output transformation;

typesetting;

packaging;

distribution;

data validation;

opportunity to manually amend data; and reporting.

Thus, in a preferred embodiment, the step of defining the component processes includes the step of defining at least five of these component processes, preferably at least eight of the component processes or further preferably all of them.

In order to implement the method, the method may include providing a scheduling engine to execute the delivery of product instances according to the variable parameters. The method may also include populating a database with workflow templates, the component processes associated with each workflow template, the variable parameters associated with each step, the values of the variable parameters for specific customers, and the values of the variable parameters associated with each product instance.

In particular the step of defining a plurality of component processes may include creating a workflow database including for a plurality of component processes code for causing a scheduling engine to carry out a series of workflow steps and definitions of workflow variable parameters for the component processes.

The step of defining a plurality of workflow templates may include creating a workflow template database defining for each of a plurality of workflow templates the series of component processes for the workflow template, values of the workflow variable parameters for some of the workflow variable parameters of the component processes, and definitions of workflow template variable parameters.

The step of defining a product may further include specifying a specific workflow template, the workflow variable parameters for workflow variable parameters of component processes defined in the workflow template but not defined in the workflow template, and the workflow template variable parameters.

The step of generating a number of output documents may include passing the data of the workflow template database relating to the specific workflow template and the code for component processes defined in the specific workflow template to the scheduling engine and running the code in the scheduling engine to cause the output documents to be produced.

The invention does not just relate to the method as set out above, but also to apparatus for carrying out the method and a computer program product, which may be on a carrier, for causing a computer to carry out the method according to the invention.

BRIEF DESCRIPTION OF THE DRAWINGS

For a better understanding of the invention, specific embodiments will now be described, purely by way of example, with reference to the accompanying drawings in which.

DETAILED DESCRIPTION

Figure 1:
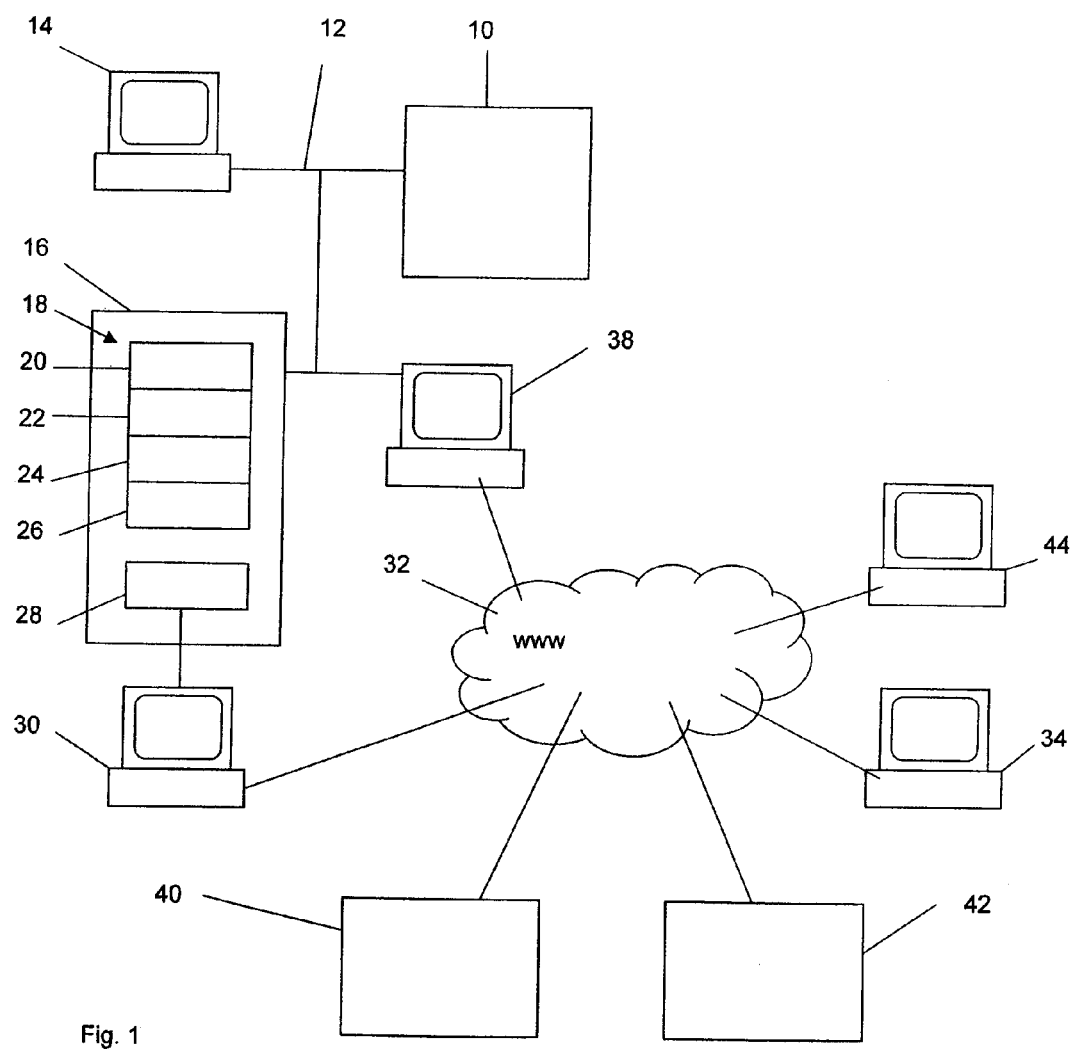
FIG. 1 shows a schematic of a system according to the invention.

Referring to FIG. 1, an embodiment of the invention is implemented by a server computer 10 acting as a scheduling engine. The server computer 10 is connected via network 12 to user computer 14 for accepting input and output from a user, database store 16 for storing a operation database 18 which may be divided into a component process database 20, a workflow template database 22, a customer database 24 and a job database 26. The database store 16 also includes a content database 28. Although the operation database 18 is shown as a number of separate sub-databases if convenient a single large operation database may be provided.

The content database 28 is updated as shown schematically by update computer 30. This update computer may in particular be connected via the world wide web 32 to data source computers 34 which act as a data source for the content database. The skilled person will appreciate how to update the content database using one or more update computers 30 so this will not be described further.

The server computer 10 is linked directly to the email server 38 to allow it to send messages to third parties, including in particular print shop 40, distribution company 42 and client computers 44. As will be appreciated, the use of an email server 38 allows such messages to be sent to almost anywhere that may be required. The skilled person is familiar with the sending of email messages so this will not be described in more detail.

Although FIG. 1 and drawing show the above components separated for clarity, the skilled person will be aware that some of these components may be combined on a sufficiently powerful computer. For example, the operation database 18 may conveniently be stored on the server 10.

Figure 2:
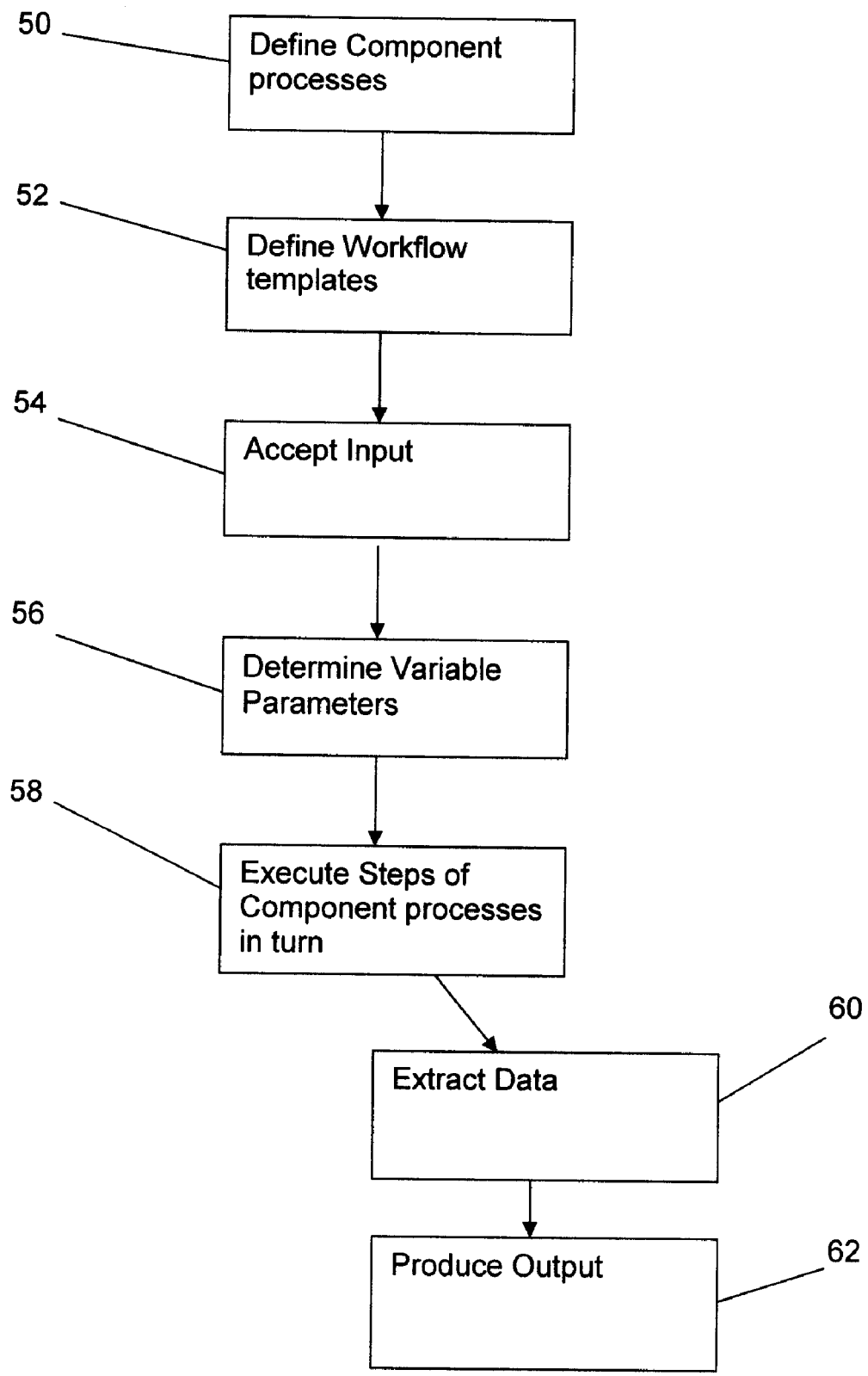
FIG. 2 shows a flow diagram of the use of this system.

The operation of the system will now be described with reference to FIGS. 2 to 4.

Firstly, in step 50, a plurality of component processes are defined and input via user computer 14 and server 10 to the workflow database 20. Each component process defines in code a series of steps, at least some of the component processes having variable parameters. Each component process is stored as code adapted to cause the server to schedule the appropriate actions.

Next, in step 52, a plurality of workflow templates are defined, again being input via user computer 14 and server 10 but this time being stored in workflow template database 22. The data stored for each workflow template includes a series of component processes.

In the preferred embodiment being described, the data stored for each workflow template includes the series of component processes for the workflow template, workflow values of the workflow variable parameters for some of the workflow variable parameters of the component processes, and workflow template variable definitions of workflow template variable parameters.

When it is required to produce a specific product, the user inputs (step 54) at user computer 14 a particular workflow template together with selection parameters determining the requirements of the document to be output as workflow template variable parameters.

The server then determines (step 56) values of the variable parameters of the component processes from the data stored in the database for the particular workflow template together with selection parameters.

Next, the server 10 carries out (step 58) the component processes of the series of component processes defined in the particular workflow template. In this example, the component processes include:

extracting data (step 60) from the content database 28 depending on the determined values of the variable parameters; and generating (step 62) a number of output documents each being an instance of the generic output document defined by the particular workflow template including data extracted from the content database in a format determined by the workflow template and the variable parameters.

As will be appreciated, each of these component processes (60, 62) define multi-step processes.

The invention will now be described in more detail with reference to a particular example in which the content database is a airline database containing details of flights from a number of airlines together with other information, for example aircraft information such as seating plans for different aircraft, airport information such as minimum connection times at different airports, and airline information such as telephone numbers for reaching different airlines. The skilled person will be familiar with other information that may be included in such a database.

Figure 3:
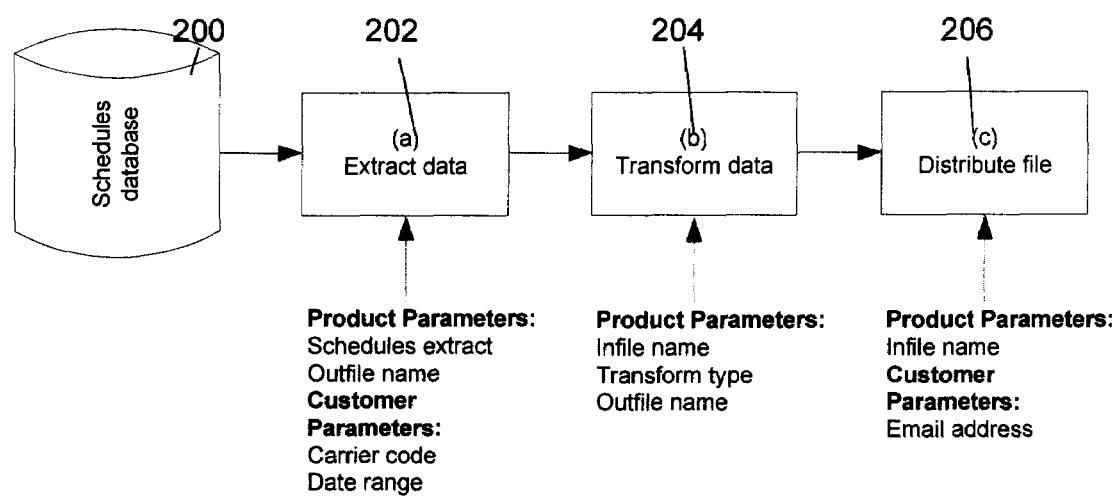
FIG. 3 illustrates a first example of a workflow template.

A first example of a workflow template and its use will now be presented with reference to FIG. 3. In this case, the workflow template produces as its output document a file listing all relevant flight schedules in a standard IATA format.

The workflow template 200 includes three component processes, the first being an extract data component process 202, the second being a transform data component process 204 and the third a distribute component process 206.

The variable data needed for the extract data component process 202 are the product parameters of (1) an outfile name and (2) address of the part of the content database to be used, and the customer parameter of (3) carrier code and (4) date range. The variable data of the transform data component process 204 include (5) the infile name, (6) a code indicating the type of transformation to be carried out and (7) the outfile name. The distribute component process 206 includes as variable parameters (8) the infile name and (9) as a customer parameter the email address.

To use this workflow template, the user inputs the variable workflow parameters, i.e. the customer parameters of (3) the carrier code, (4) the date range and (9) the email address. The workflow template determines the remainder of the component process variable parameters, ensuring that the outfile name of the extract data component matches the infile name of the next component, the transform data component, and similarly that the outfile name of the transform data component matches the infile name of the distribute component. In this case, the workflow template provides the address of the schedules part of the content database. Conveniently, the parameters determined by the workflow template always take the same values which are stored as part of the definition of the workflow template.

After the user has input the data, the server 10 runs the three component processes 202,204,206 in turn until the output file is distributed to a customer.

It will be appreciated that the workflow template definitions may be more complicated.

A second example will now be described with reference to FIG. 4. In this case, the workflow template is the workflow template for preparing a timetable for a customer, both in a format for reading on a personal digital assistant (PDA) device and for printing. The printed product is to include seating plans of the aircraft operating the routes, but the PDA product is not.

In this case, the workflow for the workflow template includes component processes for extracting data 302 from the schedules database, building 304 flight connections and transforming 306 the schedules data. The workflow template also defines component processes for extracting data 308 from the schedules database, transforming the data 310 and typesetting the data 312. Note that the typesetting component process 312 contains the code for accepting as input data from the transform data step 306 as well as from transform step 310, as is indicated by the fact that two infile names are passed to it, and outputs a file that may, on other occasions, simply be sent to a printer to print multiple output documents. Component process 314 contains the code for preparing the file for the PDA. The package component process 316 contains the code for packaging the multiple files together for distribution to a client. The distribution component process 318, contains code to simply cause the server 10 to send the file to email server 38 to allow it to be sent to client 44.

Thus, this example can be considered to provide a single output document in the form of an email, the output document being made up of a number of subsidiary output documents.

Figure 4:
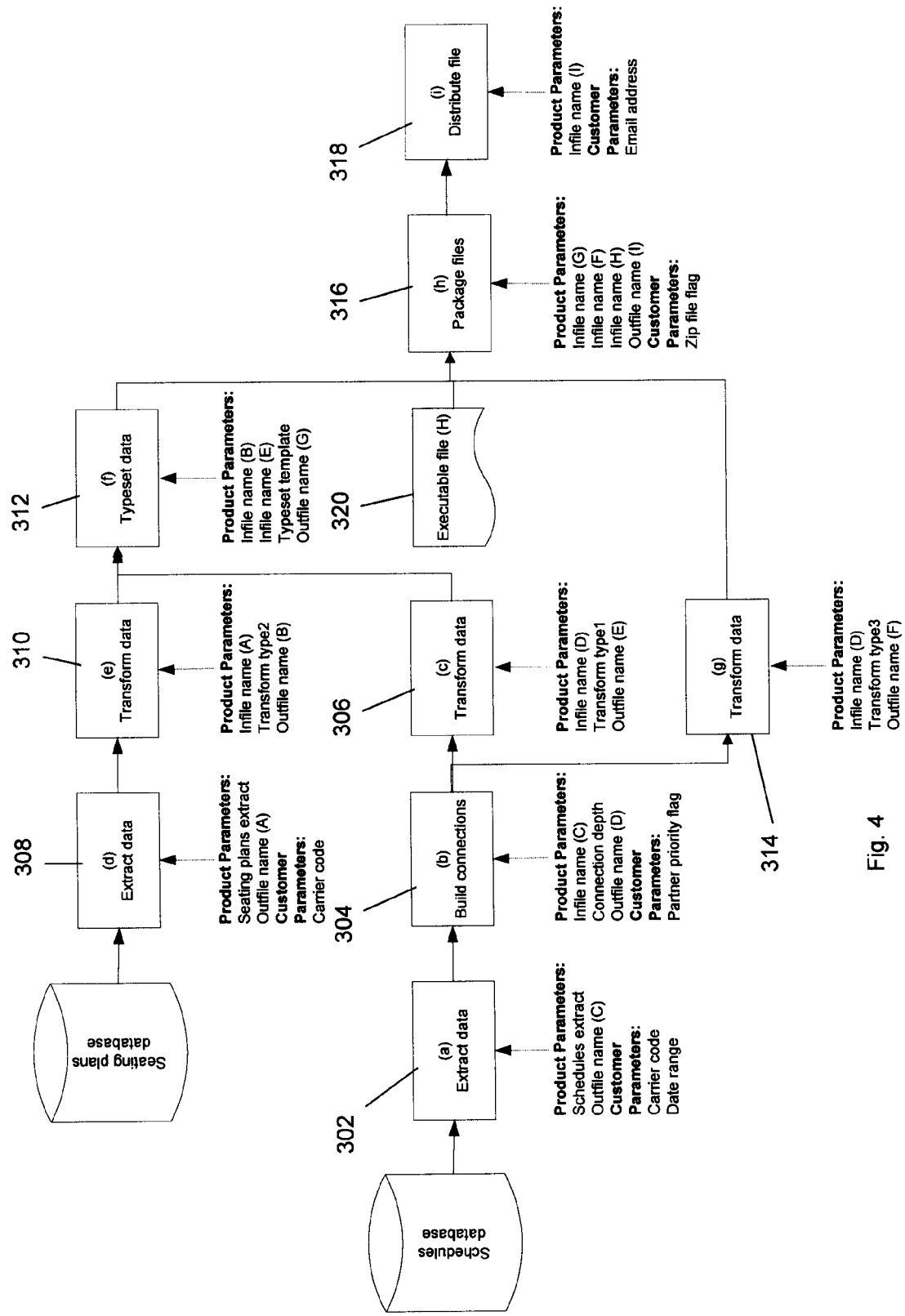
FIG. 4 illustrates a second example of a workflow template.

FIG. 4 illustrates the different variable parameters input into each of the component processes. Thus, extract data process 308 has as input component process variable parameters an extract including a pointer to the seating plans in the seating plans database, an outfile name, to store the output, and the carrier code. As above, some of these component process variable parameters, labelled "product parameters" in FIG. 4, are defined in the workflow template itself and do not require user input. Others of the variable parameters are input as workflow template variable parameters, namely carrier code, date range, partner priority flag, zip file flag and email address. These workflow variable parameters are then applied as component process variable parameters to the different component processes as required.

The workflow template is easy to prepare, based as it is on predetermined component processes, and can readily be adapted. It can also be readily run for different carriers or output destinations.

In a variation of this approach, defined in a different but very similar workflow template the typeset file is sent directly to print shop 40 and the email server sends a message to distribution company 42 to instruct the distribution company 42 to pick up the printed output from the print shop 40 and deliver it to the customer.

The invention is not limited to the embodiments described. The skilled person will readily understand how to modify the embodiments for different situations, database types and required outputs.

The invention claimed is:

1. A method of producing documents from a content database comprising:
    defining a plurality of workflow templates, each workflow template defining a series of component processes leading to generation of a generic class of output document, at least some of component processes of each workflow template having variable parameters;
    accepting input values of variable parameters of a particular workflow template as workflow selection parameters to define a product as an instance of the particular workflow template; and
    carrying out the component processes of the particular workflow template, the component processes including:
    extracting data from the content database depending on the variable parameters; and
    generating a number of output documents each being an instance of a generic output document defined by the particular workflow template including data extracted from the content database in a format determined by the workflow template and the variable parameters.

2. A method according to claim 1 further comprising:
    defining the series of component processes as code, at least some of the code of at least some of the component processes using component process variable parameters; and
    calculating the component process variable parameters of each of the component processes of the workflow template from the definition of the particular workflow template and from the input values of workflow variable parameters;
    wherein the step of carrying out the component processes of the particular workflow template includes executing the code of each of the component processes defined in the particular workflow template in turn based on the calculated workflow variable parameters.

3. A method according to claim 2, wherein
    the step of defining a plurality of component processes includes creating a component process database including for a plurality of component processes code for causing a scheduling engine to carry out a series of steps and definitions of component process variable parameters for respective component processes; and
    the step of defining a plurality of workflow templates includes creating a workflow template database defining for each of a plurality of workflow templates a series of component processes for a respective workflow template, values of at least some component process variable parameters for the defined component processes, and links between workflow template variable parameters and the component process variable parameters for the others of the component process variable parameters.

4. A method according to claim 3 wherein
    the step of defining a product includes specifying a specific workflow template, and the workflow template variable parameters; and
    the step of generating a number of output documents includes passing the data of the workflow template database relating to the specific workflow template and passing the code from the component process database of the component processes defined in the workflow template to the scheduling engine and running the code in the scheduling engine to cause the number of output documents to be produced.

5. A method according to claim 2 wherein the step of defining component processes includes defining at least five of the following component processes:
    data extraction; data manipulation; output transformation; typesetting; packaging; distribution; data validation; manually amending data; and reporting.

6. A method according to claim 1 wherein the step of generating a number of output documents includes printing copies of the output document.

7. A method according to claim 1 wherein the step of generating a number of output documents includes generating an electronic file in human-readable format and transmitting those documents.

8. A method according to claim 1 wherein the component processes of at least some of the workflow templates include the step of producing a draft document for checking, accepting input amending the draft document and then producing the number of output documents required based on the amended draft.

9. A method according to claim 1 wherein the component processes of at least some of the workflow templates include distributing the output document.

10. A method according to claim 1 wherein the content database is a database including over 10 000 records.

11. A method according to claim 1 wherein the content database is an airline flight information database.

12. Apparatus for creating and outputting documents, comprising:
- a content database;
- a scheduling engine for scheduling a number of tasks; and
- an operations database including:
  - definitions of a plurality of workflow templates, each workflow template defining a series of component processes leading to generation of a generic class of output document, at least some of component processes of each workflow template having component process variable parameters; and
  - definitions of the component processes including definitions of:
  - a component process or processes for extracting data from the content database depending on the determined values of the variable parameters and a component process or processes for generating a number of output documents each being an instance of the generic class of output document defined by a particular workflow template including data extracted from the content database in a format determined by the workflow template and the variable parameters;
- wherein the scheduling engine is arranged to accept as input the identity of a particular workflow template and values of workflow template variable parameters from the selection parameters;
- to calculate respective component process variable parameters for the component processes defined in the particular workflow template; and
- to carry out the component processes of the particular workflow template with the calculated component process variable parameters.

13. Apparatus according to claim 12 further comprising a user computer for inputting selection parameters determining the requirements of the document to be output.

14. Apparatus according to claim 12, further comprising an email server for transmitting documents.

15. Apparatus according to claim 12 wherein the content database is a database including over 10 000 records.

16. Apparatus according to claim 12 wherein the content database is an airline flight information database.

17. A computer program product including code on a carrier for extracting data from a content database, the computer program product including:
- code for accepting definitions of a plurality of workflow templates, each workflow template defining a series of component processes leading to generation of a generic class of output document, at least some of component processes of each workflow template having component process variable parameters;
- code for accepting as input the identity of a particular workflow template and values of workflow template variable parameters of the particular workflow template to define a product as an instance of the particular workflow template; and
- code for carrying out the component processes of the particular workflow template, wherein the computer program product includes definitions of component processes including:
- code defining a component process for extracting data from the content database depending on the variable parameters; and
- code defining a component process for generating a number of output documents each being an instance of the generic class of output document defined by the particular workflow template including data extracted from the content database in a format determined by the workflow template and the variable parameters.

18. A computer program product recorded on a carrier according to claim 17, further comprising:
- code defining a plurality of component processes, at least some of the component processes having component process variable parameters; and
- code for calculating the component process variable parameters from the identity of the particular workflow template and from the input values of workflow template variable parameters;
- wherein the code for carrying out the component processes of the particular workflow template is arranged to execute workflow steps of each of the component processes defined in the particular workflow template in turn based on the calculated workflow variable parameters.

* * * * *